United States Patent
White

[19]

[11] Patent Number: 6,058,425
[45] Date of Patent: May 2, 2000

[54] SINGLE SERVER ACCESS IN A MULTIPLE TCP/IP INSTANCE ENVIRONMENT

[75] Inventor: Kenneth D. White, San Jose, Calif.

[73] Assignee: International Business Machines Corporation, Armonk, N.Y.

[21] Appl. No.: 08/897,505

[22] Filed: Jul. 21, 1997

[51] Int. Cl.[7] .................................................. G06F 13/00
[52] U.S. Cl. .................... 709/227; 709/202; 709/203; 709/228; 709/229
[58] Field of Search .................................. 709/202, 203, 709/227, 228, 229

[56] References Cited

U.S. PATENT DOCUMENTS

| | | | |
|---|---|---|---|
| 5,491,800 | 2/1996 | Goldsmith et al. ....................... | 709/300 |
| 5,636,371 | 6/1997 | Yu ............................................ | 709/227 |
| 5,644,718 | 7/1997 | Belove et al. ........................... | 709/227 |
| 5,754,774 | 5/1998 | Bittinger et al. ........................ | 709/203 |
| 5,764,915 | 6/1998 | Heimsoth et al. ....................... | 709/227 |
| 5,764,916 | 6/1998 | Busey et al. ............................. | 709/227 |
| 5,796,393 | 8/1998 | MacNaughton et al. ................ | 709/203 |
| 5,802,306 | 9/1998 | Hunt ........................................ | 709/203 |
| 5,881,230 | 3/1999 | Christensen et al. .................... | 709/203 |

*Primary Examiner*—Kevin J. Teska
*Assistant Examiner*—William D. Thomson
*Attorney, Agent, or Firm*—Myers Bigel Sibley & Sajovec; Jerry W. Herndon

[57] ABSTRACT

Methods, systems and computer program products are provided that access a single server application executing on a processing system having multiple TCP/IP instances. The single server application may be accessed by establishing a registration repository containing information sufficient to identify to both the single server application and a client application seeking to access the single server application, one of the multiple TCP/IP instances through which the single server application may be accessed by client applications. In such a case, the registration repository is accessible by the multiple TCP/IP instances and the single server application.

40 Claims, 5 Drawing Sheets

SINGLE SERVER ACCESS IN A MULTIPLE TCP/IP INSTANCE ENVIRONMENT

FIELD OF THE INVENTION

The present invention relates to computer systems in general and more particularly to computer systems employing the Transmission Control Protocol/Internet Protocol (TCP/IP) to access server applications.

BACKGROUND OF THE INVENTION

In recent years there has been an increase in interest in the Internet and Internet applications. The Internet is a client-server paradigm where clients access server applications to obtain information. This proliferation of Internet users has led to many networks employing the same client-server paradigm in an internal network known as an intranet. These intranets are often built on the same communications protocols as the Internet. Thus a user or client may communicate with a server on an internal network or on the Internet in a seamless fashion such that the location of the server and access to that server may be transparent to a user.

The communication protocol on which the Internet is based is known as the Transmission Control Protocol/Internet Protocol (TCP/IP). The popularity of the Internet and of intranets has led to the proliferation of TCP/IP throughout the computing community. This proliferation has led to TCP/IP being utilized on local area networks (LANs), wide area networks (WANs) and even on mainframe computers such as the International Business Machines Corporation's OS/390 systems.

To communicate using TCP/IP, a computer system typically has a TCP/IP protocol stack executing on the computer. A TCP/IP protocol stack or TCP/IP instance governs the communications between the client and the server. If the computer systems capabilities allow, a computer system may have multiple TCP/IP instances communicating with multiple clients and servers. Thus, as is illustrated in FIG. 1, a computer system 22 may have multiple TCP/IP instances (illustrated by TCP/IP A 12 and TCP/IP B 16) and multiple servers (illustrated by Server A 10 and Server B 14) communicating with multiple clients (illustrated by Client A 18 and Client B 20).

Figure 1:
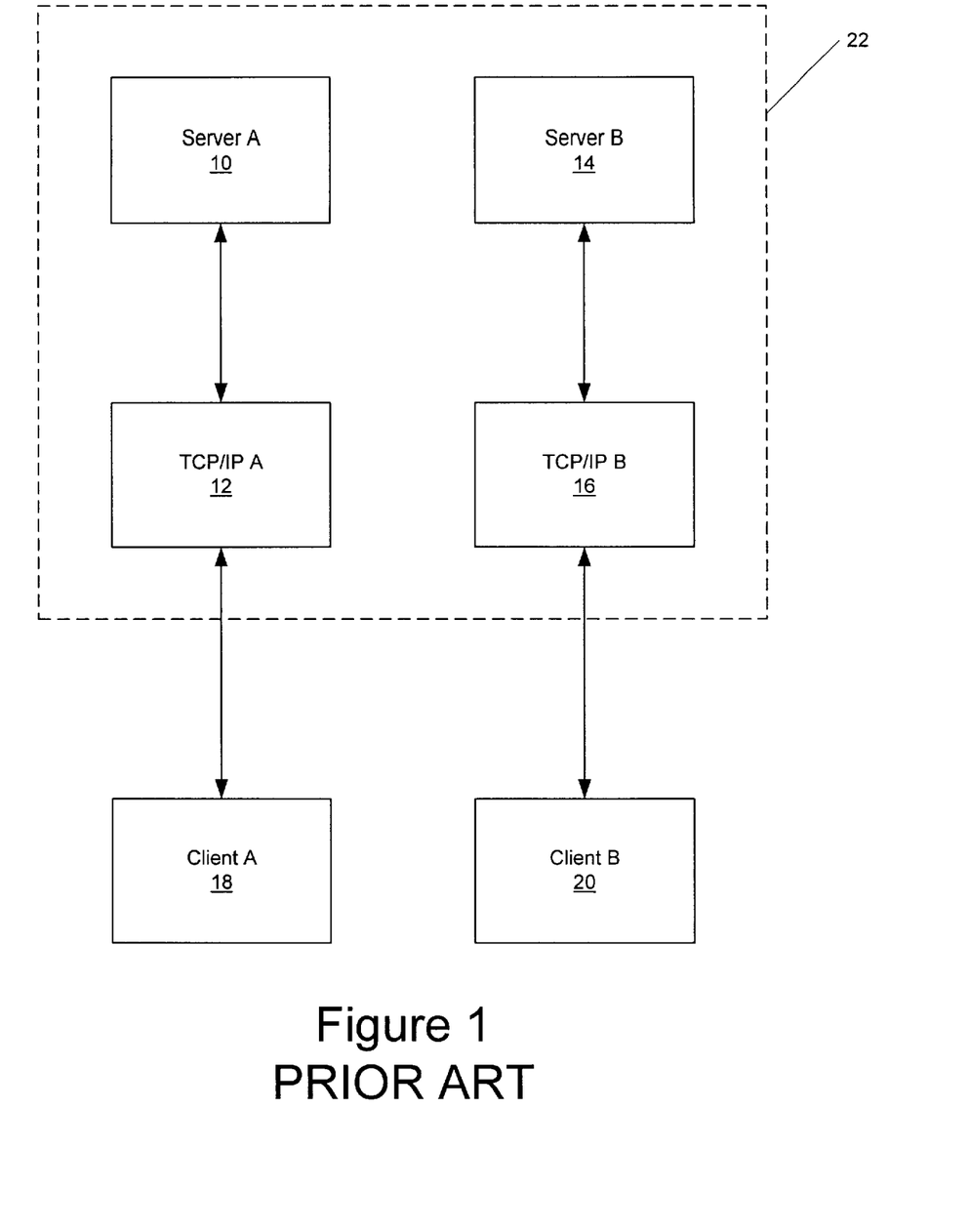
FIG. 1 is a block diagram of a conventional multiple client/multiple server system.

One typical constraint of the client-server model illustrated in FIG. 1, is that applications such as Server A 10 and Server B 14 may not span multiple TCP/IP instances. Thus, where multiple TCP/IP instance exist on a single computer system a particular server is limited to the IP address domain of the TCP/IP instance to which it is connected. Thus, to support clients connecting to the computer system through more than one of the computer systems TCP/IP instances a duplicate of the server should be connected to each of the TCP/IP instances. Thus, to make a server application available to all IP address domains of a computer system the computer system is generally either limited to a single TCP/IP instance or to duplicate copies of a server application for each TCP/IP instance of the computer system.

While in some situations multiple copies of a server application may be acceptable, in certain situations it is not possible to have multiple copies of a server on a single computer system. Limitations on the number of allowable server applications may be imposed architecturally by the server application or may result from hardware or software limitations for the system. For example, only a single instance of the OS/390 OpenEdition Open System Adapter Support Facility (OSA/SF) may run in a MVS partition although up to 8 TCP/IP instances are allowed. Thus, in order to be available to all clients in a computer system's IP domain then only a single TCP/IP instance may be utilized on a computer system with such a server.

Even if a particular server application allows for multiple instances in a single computer system and the computer system's hardware and software are capable of multiple copies of a server there may still be disadvantages to multiple copies of a server on a single system. For example, system resources are still occupied by multiple copies of a server application. Central Processing Unit (CPU) usage may be increased as well as storage and memory requirements. Furthermore, synchronization of multiple copies of a server application to provide consistent server responses across multiple TCP/IP instances may also present difficulties.

In view of the above discussion, there exists a need for improvement in computer systems having multiple TCP/IP instances to allow access to server applications across the IP domain's of multiple TCP/IP instances.

SUMMARY OF THE INVENTION

In light of the limitations of existing client-server systems, it is an object of the present invention to provide for the access to server applications across multiple TCP/IP instances.

A further object of the present invention is to provide access to server applications across multiple TCP/IP instances without requiring the system resources of replicating the server application.

Another object of the present invention is to provide access across multiple TCP/IP instances to a server application for which multiple copies cannot be provided on a single computer system.

These and other objects of the present invention are provided by methods, systems and computer program products that access a single server application executing on a processing system having multiple TCP/IP instances. The single server application may be accessed by establishing a registration repository containing information sufficient to identify to both the single server application and a client application seeking to access the single server application, one of the multiple TCP/IP instances through which the single server application may be accessed by client applications. In such a case, the registration repository is accessible by the multiple TCP/IP instances and the single server application.

By establishing a registration repository in which clients may determine which TCP/IP instance of multiple TCP/IP instances to access to reach a single server application, the client may connect through that TCP/IP instance to reach the single server application. Thus, only a single instance of the server application may be provided on the computer system and may be accessed by any client with access to the registration repository. Furthermore, because multiple copies of a server application are not required there may be fewer resources used to allow access from all of the IP domains of the computer system. Also, because the multiple copies of the server application are not require to provide access to the server applications to clients of multiple TCP/IP instances, the present invention allows server application which cannot have multiple copies to be accessible across multiple TCP/IP instances.

In a particular embodiment of the present invention, the registration repository is established by registering a TCP/IP instance with the registration repository if single server access is requested by a client application utilizing the TCP/IP instance. In such a case, the registration may include storing an entry identifying an available TCP/IP instance. A time stamp associated with the entry identifying the available TCP/IP instance which identifies when the TCP/IP instance was registered with the registration repository may also be stored in the registration repository.

In a preferred embodiment, the registration repository entry includes the TCP/IP instance identifier, the function of the server application associated with the TCP/IP instance and protocol information sufficient to allow connection between the TCP/IP instance and the client.

In another embodiment of the present invention entries for a TCP/IP instance are removed from the registration repository when a TCP/IP instance is no longer available for connection to the single server application or client access to the single server application. In such a case, the entry may be removed by invalidating the registration of the TCP/IP instance in the registration repository.

In another embodiment of the present invention, the single server application selects a TCP/IP instance from the registration repository to be used for connection to the single server application. In a particular aspect of the present invention, an entry identifying an available TCP/IP instance is stored in the registration repository. A time stamp associated with the entry identifying the available TCP/IP instance is also stored in the registration repository. Then, the selection of the TCP/IP instance comprises selecting the TCP/IP instance with the earliest time stamp.

In still another embodiment of the present invention wherein the client application accesses the registration repository to determine the TCP/IP instance through which the single server application may be accessed. The client application then connects to the single server application by connecting to the TCP/IP instance through which the single server application may be accessed. In such a case, the client application may determine the TCP/IP instance through which the single server application may be accessed utilizing the same procedure by which the single server application selects a TCP/IP instance. Furthermore, an entry identifying an available TCP/IP instance and a time stamp associated with the entry identifying the available TCP/IP instance in the registration repository may be stored in the registration repository. Then the access of the registration repository may include accessing the registration repository to obtain the time stamp of entries in the registration repository and selecting the TCP/IP instance with the earliest time stamp as the TCP/IP instance through which the single server application may be accessed.

In another embodiment of the present invention, the registration repository is stored in common storage. Accessing the registration repository then includes accessing the common storage location of the registration repository and obtaining from the common storage location registration information to determine the TCP/IP instance through which the single server application may be accessed. Furthermore, the single server application may then be connected to by connecting to the determined TCP/IP instance through which the single server application may be accessed. Also, the common storage may be directly accessible by the client.

In yet another embodiment of the present invention, the common storage is accessed by accessing a first TCP/IP instance to access the common storage location of the registration repository. Registration information is then obtained from the common storage location through the first TCP/IP instance and the single server application connected to through a second TCP/IP instance.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 2:
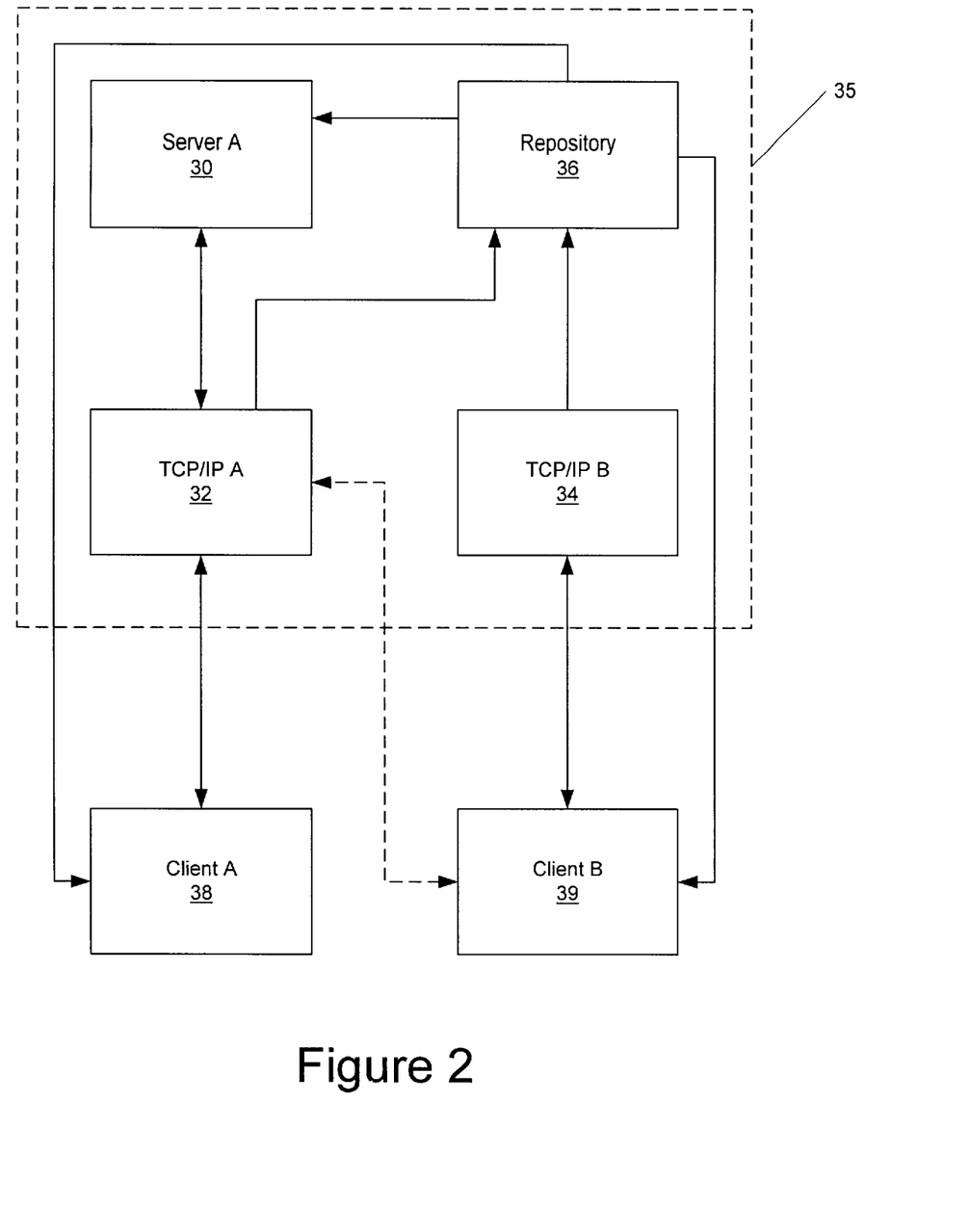
FIG. 2 is a block diagram of a client-server system according to the present invention.

FIG. 2 illustrates a computer system utilizing the present invention. As seen in FIG. 2, a computer system 35 includes a single server application (Server A 30) and multiple TCP/IP instances (TCP/IP A 32 and TCP/IP B 34). Connected to the TCP/IP instances 32 and 34 are client applications (Client A 38 and Client B 39) to the server application 30. The computer system 35 may be any computer system capable of supporting multiple TCP/IP protocol stacks, however, the present invention is particularly well suited to mainframe computers such as International Business Machines Corporation's OS/390 computer systems utilizing the Multiple Virtual System (MVS) operating system. Thus, as will be appreciated by those of skill in the art, computer system 35 will typically include a processing unit, random access memory, non-volatile memory, mass storage devices, input devices, output devices and communication devices as well as software applications and an operating system to control the various devices and application associated with computer system 35.

As is further illustrated in FIG. 2, a registration repository 36 is provided in computer system 35. The registration repository is accessible by the TCP/IP instances 32 and 34 as well as the server 30 and client applications 38 and 39. The registration repository is preferably directly accessible by the clients 38 and 39 as is illustrated in FIG. 2, but may also be accessible indirectly through, for example, the TCP/IP instances 32 and 34. The registration repository 36 is preferably implemented in common storage of computer system 35. Thus, for example, in an MVS system where the registration repository is implemented in common storage, a client may directly address the common storage associated with the registration repository to retrieve entries from the registration repository. Similarly, the server application could directly access the common storage to retrieve entry information.

In a further aspect of the present invention where the computer system 35 is a logical unit in a Sysplex the registration repository could be implemented in the coupling facility of the Sysplex. Thus, a single server application could be shared across logical units of the Sysplex and provide single server access to the IP address domain of all of the logical units with access to the coupling facility.

In operation, the TCP/IP instances 32 and 34 create entries in the registration repository uniquely identifying the TCP/IP instance. When a server application is started it selects a TCP/IP instance from the entries in the registration repository. When a client seeks to access a single server application 30, the client 39 accesses the registration repository 36 and retrieves the information indicating which TCP/IP instance allows access to the single server application 30. This selection process may be accomplished by the clients using the same selection mechanism as the server applications in selecting from the TCP/IP instances registered with the registration repository. The client 39 then connects to the TCP/IP instance 32 with access to the single server application 30.

Alternatively, a server application could access the registration repository to determine which TCP/IP instances allow single server access and then select one of the TCP/IP instances. The server could then update the registration repository to indicate that the server application was associated with the selected TCP/IP instance. Clients would then search the entries in the registration repository to find an entry identifying the desired server application and then utilize the associated TCP/IP instance to access the server application. However, such an implementation is essentially a special case of the first alternative. Accordingly, the detailed operation described below focuses primarily on the first alternative briefly described above. Those of skill in the art will understand that the special case may be readily implemented once the principles of the general case are understood.

The present invention will now be described with respect to FIG. 3 and FIG. 4 which are flowcharts illustrating the operation of a routing device and a master routing device utilizing the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 3:
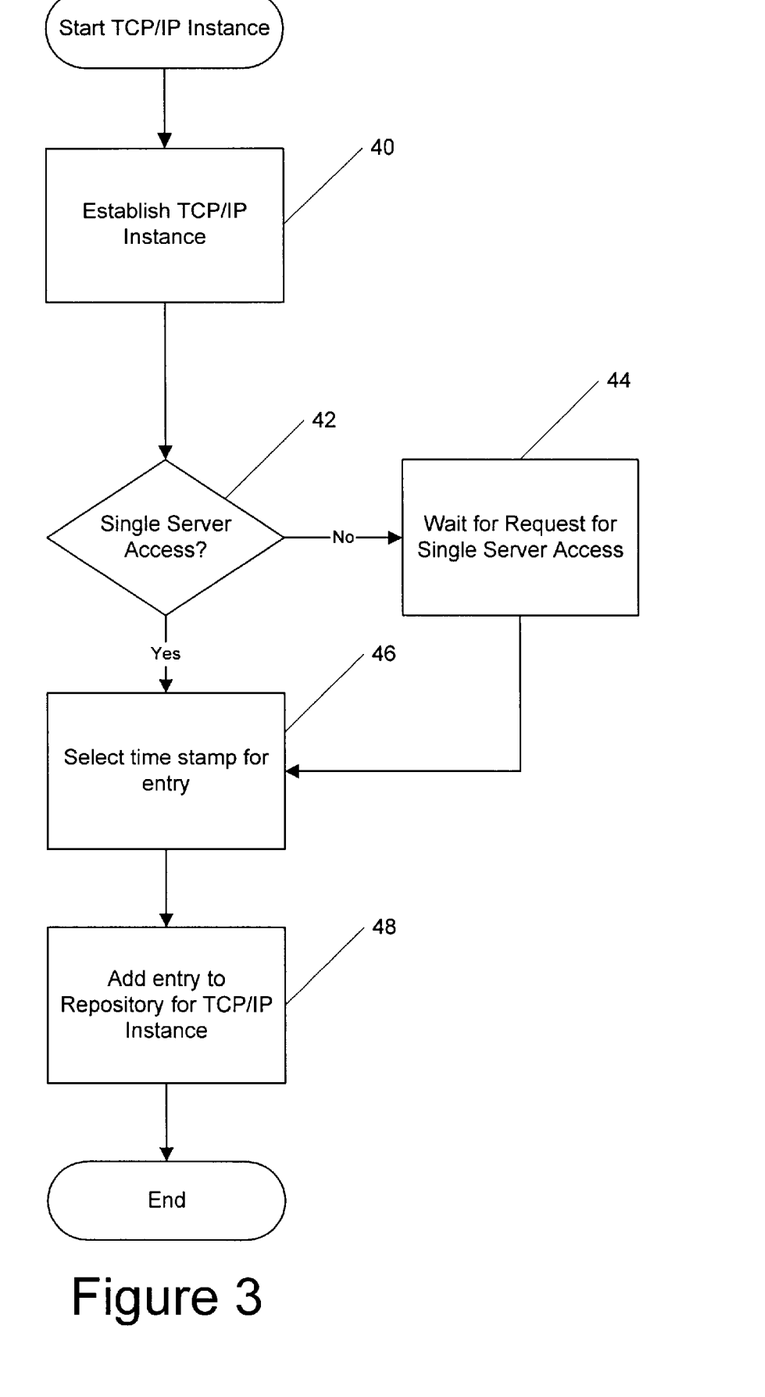
FIG. 3 is a flow chart illustrating the creation of an entry in a registration repository according to the present invention.

FIG. 3 illustrates the creation of an entry in the registration repository 36 when a TCP/IP instance is started. When a TCP/IP instance is configured to require access to a single server application, either initially or dynamically after startup of the TCP/IP instance, an entry is added to the registration repository. As seen in FIG. 3, a TCP/IP instance is established (block 40) and determines in a client requires access to a single server application (block 42). If single server access is not required then the TCP/IP instance enters a wait loop (block 44) until a client request single server access.

If a client initially requests single server access or subsequently request single server access, then the TCP/IP instance selects a time stamp for incorporation in the registration repository entry (block 46). The time stamp acts as a unique identifier of the TCP/IP instance and prioritizes the TCP/IP instances for selection by clients and server applications. The time stamp may be the time the TCP/IP instance was started or when the registration request was made. Whatever manner of selecting a time stamp is utilized it needs to be the same for all TCP/IP instances.

Alternatively, other methods of providing unique priority for the TCP/IP instances could be utilized. For example, priority tokens could be selected by TCP/IP instances or a priority count could be established and incremented each time a TCP/IP instance is initiated. What is required is a manner of identifying TCP/IP instances such that the client and the server may utilize the same selection procedure to reach the same selection result. Thus, whatever manner of prioritizing TCP/IP instances is utilized it should be utilized in the same manner for all TCP/IP instances.

Returning to FIG. 3, after selection of a time stamp, the TCP/IP instance adds an entry to the registration repository 36 for the TCP/IP instance (block 48). The entry in the repository preferably includes the TCP/IP instance identifier and protocol information sufficient to allow connection between the TCP/IP instance and the client. As briefly discussed above, the entry may also include the function of the server application associated with the TCP/IP instance.

By creating an entry in the registration repository 36 if a client requests access to a single server application, the present invention assures that at least one TCP/IP instance will be available in the registration repository 36 for selection by the server application. For example, in FIG. 2, if client 38 is the first client associated computer system 35 that request access to a single server application then upon receiving the request TCP/IP A 32 will create an entry in registration repository 36 to identify that it has received a request for single server access and to become available for selection by server 30 for use. Thus, even if a request for single server access is the first request received a TCP/IP instance will be present in the registration repository for use by the server application and the client. Additionally, by registering with the registration repository on a per TCP/IP instance basis, client access to a server application may be allowed or disallowed on a per TCP/IP instance basis.

With respect to the server application, a server application accesses the registration repository at start-up to select a TCP/IP instance. If no TCP/IP instances are identified in the registration repository, the server enters a wait loop until one is entered. The server then selects the TCP/IP instance and connects to that instance. Optionally, the server may update the registration repository to indicate that the server is connected to the TCP/IP instance. The server preferably selects the TCP/IP instance based upon the time stamp of the TCP/IP instance entry in the registration repository. However, other methods of selection may be utilized as long as the clients also use the same selection procedure. If the TCP/IP instance to which the server is connected terminates, the server re-accesses the registration repository to select a new TCP/IP instance for connection.

Figure 4:
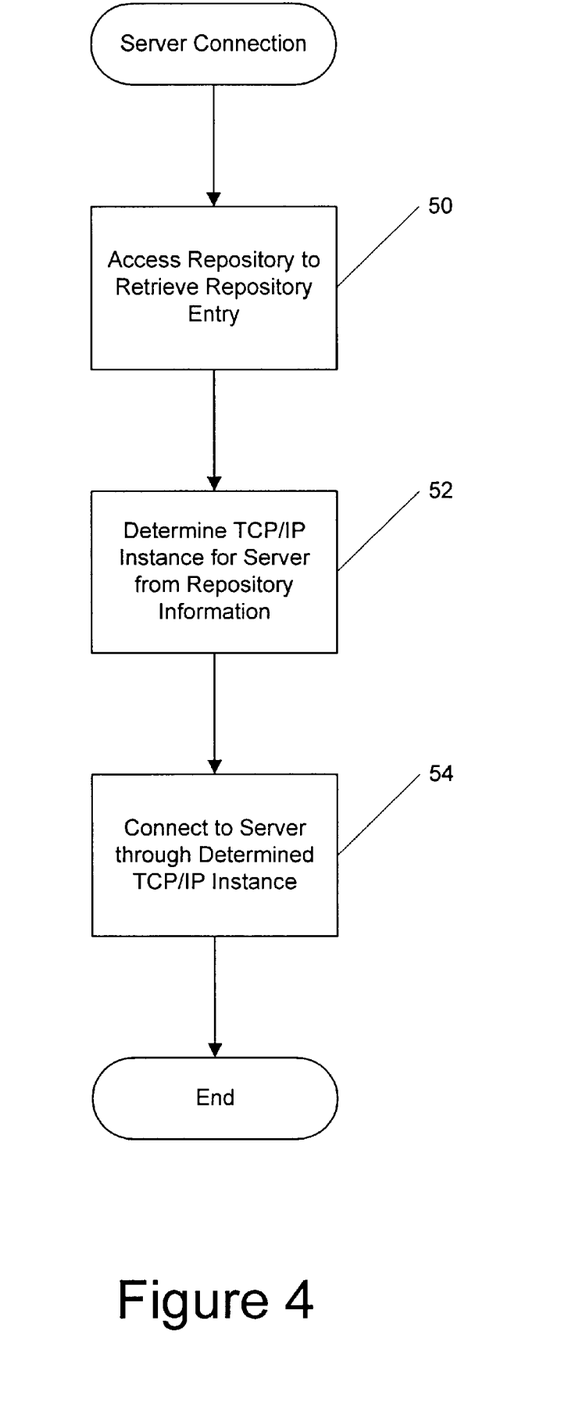
FIG. 4 is a flow chart illustrating the operation of the present invention.

FIG. 4 illustrates the operation of a client communication utilizing the present invention. When a client seeks to access a single server application, the client first accesses the registration repository 36 to retrieve the entry with the earliest time stamp (block 50). The client will utilize this entry to attempt to connect to the server. The server also accesses the repository to establish connections and uses the same selection process as clients. Therefore, even if the TCP/IP instance is one which is in the process of terminating, both the client and the server should eventually select the same TCP/IP instance if the same selection process is utilized.

After retrieving the entry from the registration repository, the client determines the TCP/IP instance through which a connection may be established to the server (block 52). As discussed above, this may be the TCP/IP instance corresponding to the earliest time stamp entry in the registration repository. However, other criteria for selecting the TCP/IP instance may be utilized as long as the client and the server use the same criteria. The client then connects to the server using the determined TCP/IP instance (block 54). Such a connection is possible because, as discussed above, the registration entry contains sufficient information to allow for a connection between the TCP/IP instance, the client and the server.

In the event of an error or termination of the TCP/IP instance, the TCP/IP instance notifies the clients and servers utilizing the TCP/IP instance of the error. The terminating TCP/IP instance is removed from the registration repository. The clients and servers then would reaccess the registration repository to select a different TCP/IP instance for reestablishing connections or wait until an eligible TCP/IP instance is available (i.e. registered in the repository). Again, because the clients and servers would utilize the same process for selecting a TCP/IP instance a connection should be capable of being established.

The terms "single server access" and "single server application" have been used herein to describe the present invention. As used herein, those terms refer to instance of a server application which span multiple TCP/IP instances in that clients from multiple IP domains may access a single instance of a server application.

Figure 5:
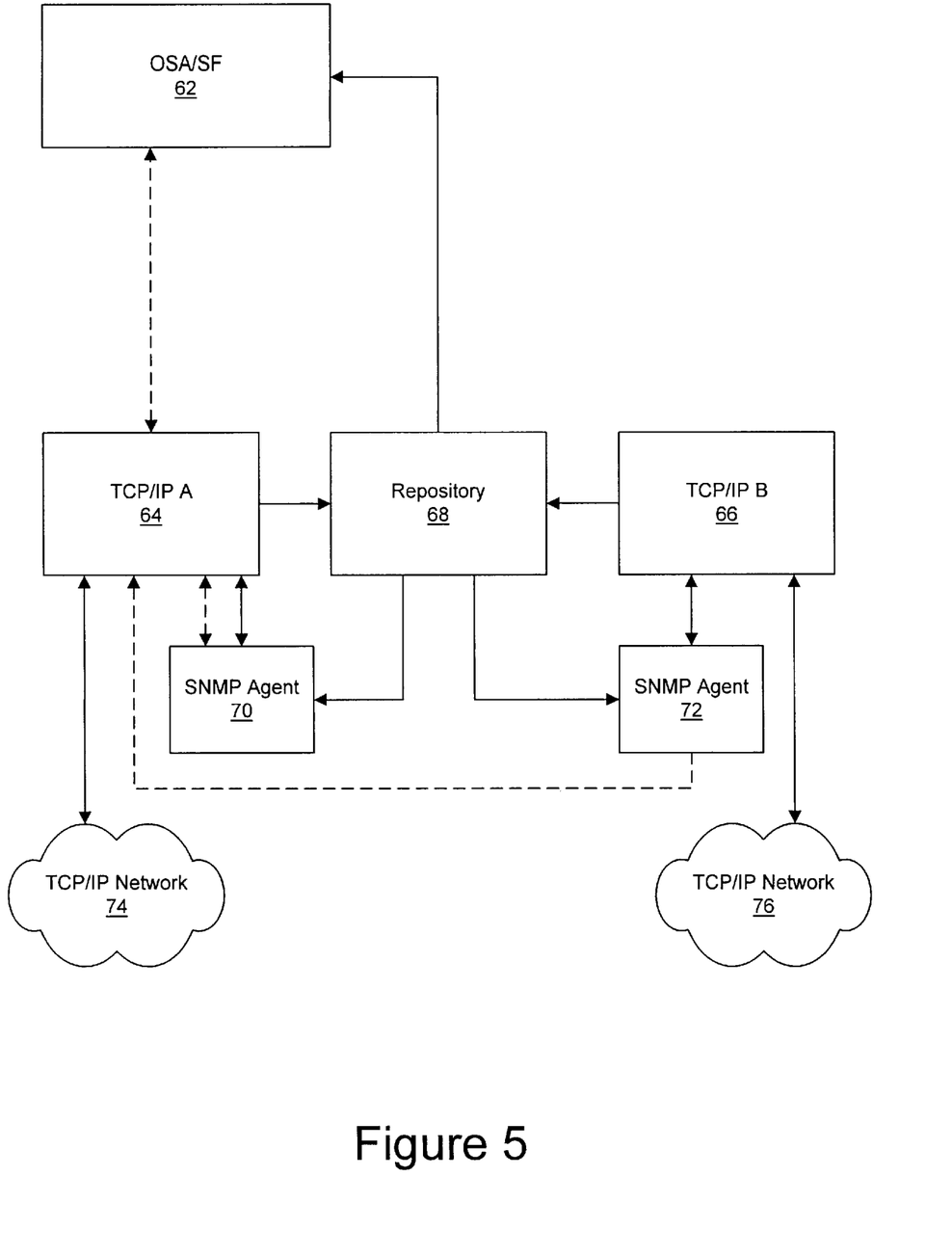
FIG. 5 is a block diagram of an example system utilizing the present invention.

The present invention may be further understood by way of example. FIG. 5 illustrates one computer system in which the present invention may be utilized. As seen in FIG. 5, a computer system utilizes OSA/SF in an MVS partition. Multiple TCP/IP instances also include SNMP support.

In the example depicted by FIG. 5, the two TCP/IP instances, TCP/IP A 64 and TCP/IP B 66, were started with both requiring client access to the single server application represented by OSA/SF 62. OSA/SF (Open System Adapter/ Support Facility) is an application that manages OSA Adapters on a OS/390 system. Only a single instance of OSA/SF can be started per MVS system due to architecture constraints.

TCP/IP A 64 is identified in the Repository 68 as the first eligible TCP/IP instance for single server application access to OSA/SF 62. The single server application, OSA/SF 62 connects to TCP/IP A 64 after accessing the Repository 68 to determine that TCP/IP A 64 corresponds to the entry in the repository with the earliest time stamp.

At some point, two OSA/SF Client Applications, SNMP Agent 70 and SNMP Agent 72 are also started. Each of the client applications, SNMP Agent 70 and SNMP Agent 72, connects into their respective TCP/IP instance in order to receive requests from the associating TCP/IP Networks, 74 and 76.

Each TCP/IP instance requires separate SNMP Agents in order to provide network management support for each of the respective IP Address domains for TCP/IP Network 74 and TCP/IP Network 76. SNMP (Simple Network Management Protocol) is a standard management protocol implemented by many TCP/IP Hosts. The SNMP Agents handle all of the related SNMP protocol functions but require access to OSA/SF 62 in order to retrieve and set configuration variables specific to the adapters managed by OSA/SF.

When the SNMP Agent 70 is started, it connects to the single server application OSA/SF 62 via TCP/IP A 64 after accessing the Repository 68 to determine that TCP/IP A 64 is the first eligible TCP/IP instance. The client application SNMP Agent 72 after accessing the Repository 68 also establishes a connection to the Single Server application OSA/SF 62 through TCP/IP A 64. Note that both client applications actually have two connections established. The first is to their respective TCP/IP instance in order to receive and respond to requests from their respective TCP/IP Networks 74 and 76. Both SNMP Agent 70 and 72 establish a second connection through TCP/IP A 64 in order to gain access to the single server application, OSA/SF 62. In FIG. 5, the SNMP Agents (clients) and OSA/SF (server) connections are depicted using dashed lines. Thus, a single server application such as OSA/SF may be accessed by multiple IP address domains through multiple TCP/IP instances where only a single TCP/IP instance is connected directly to the server application.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of accessing a single server application executing on a processing system having multiple TCP/IP instances and wherein the single server application is accessed through a first TCP/IP instance of the multiple TCP/IP instances, the method comprising:

establishing a registration repository containing information sufficient to identify to both the single server application and a client application seeking to access the single server application, the first TCP/IP instance through which the single server application may be accessed by client applications and wherein the registration repository is accessible by the multiple TCP/IP instances and the single server application; and providing registration repository information to at least one of the single server application and the client application so as to allow direct communications between the single server application and the client application utilizing the first TCP/IP instance through which the single server application may be accessed and wherein the registration repository information is provided to the client application utilizing a second TCP/IP instance different from the first TCP/IP insurance.

2. A method according to claim 1, wherein said step of establishing a registration repository comprises the step of registering a TCP/IP instance with the registration repository if single server access is requested by a client application utilizing the TCP/IP instance.

3. A method according to claim 2, wherein said step of registering comprises the steps of:
storing an entry identifying an available TCP/IP instance; and
storing a time stamp associated with the entry identifying the available TCP/IP instance which identifies when the TCP/IP instance was registered with the registration repository.

4. A method according to claim 3, wherein the entry identifying the TCP/IP instance includes a TCP/IP instance identifier and protocol information sufficient to allow connection between the TCP/IP instance and the client.

5. A method according to claim 2, further comprising the step of removing from the registration repository a TCP/IP instance which is no longer available for connection to the single server application or client access to the single server application.

6. A method according to claim 5, wherein said step of removing comprises the step of invalidating the registration of the TCP/IP instance in the registration repository.

7. A method according to claim 1, wherein the single server application carries out the step of selecting the TCP/IP instance from the registration repository to be used for connection to the single server application.

8. A method according to claim 7, further comprising the steps of:
storing an entry identifying an available TCP/IP instance in the registration repository and
storing a time stamp associated with the entry identifying the available TCP/IP instance in the registration repository; and
wherein said step of selecting a TCP/IP instance comprises the step of selecting the TCP/IP instance with the earliest time stamp.

9. A method according to claim 7, wherein the client application carries out the steps of:
accessing the registration repository to determine the TCP/IP instance through which the single server application may be accessed; and
connecting to the single server application by connecting to the TCP/IP instance through which the single server application may be accessed.

10. A method according to claim 9, wherein the client application determines the TCP/IP instance through which the single server application may be accessed utilizing the same procedure by which the single server application selects a TCP/IP instance.

11. A method according to claim 9, further comprising the steps of:
storing an entry identifying an available TCP/IP instance in the registration repository; and
storing a time stamp associated with the entry identifying the available TCP/IP instance in the registration repository; and
wherein said step of accessing the registration repository comprises the steps of:
accessing the registration repository to obtain the time stamp of entries in the registration repository and
selecting the TCP/IP instance with the earliest time stamp as the TCP/IP instance through which the single server application may be accessed.

12. A method according to claim 9, wherein the registration repository is stored in common storage and wherein said step of accessing the registration repository comprises the steps of:
accessing the common storage location of the registration repository; and
obtaining from the common storage location registration information to determine the TCP/IP instance through which the single server application may be accessed; and
wherein said step of connecting to the single server application comprises the step of connecting to the determined TCP/IP instance through which the single server application may be accessed.

13. A method according to claim 12, wherein said common storage is directly accessible by the client and wherein said step of accessing the common storage comprises the step of directly accessing the common storage.

14. A method according to claim 12, wherein said step of accessing the common storage comprises the step of accessing the second TCP/IP instance to access the common storage location of the registration repository;
wherein said step of obtaining registration information comprises the step of obtaining registration information from the common storage location through the second TCP/IP instance; and
wherein said step of connecting to the single server application comprises the step of connecting to the first TCP/IP instance through which the single server application may be accessed.

15. A system for accessing a single server application executing on a processing system having multiple TCP/IP instances and wherein the single server application is accessed through a first of the multiple TCP/IP instances comprising:
a registration repository containing information sufficient to identify to both the single server application and a client application seeking to access the single server application, the first TCP/IP instance through which the single server application may be accessed by client applications and wherein the registration repository is accessible by the multiple TCP/IP instances and the single server application; and
means for accessing the registration repository to select a TCP/IP instance for connection to the server application so that the single server application and the client application seeking to access the single server application may both access the registration repository to allow direct communications between the single server application and the client application utilizing the first TCP/IP instance through which the single server application may be accessed and wherein the registration repository information is provided to the client application utilizing a second TCP/IP instance different from the first TCP/IP instance.

16. A computer program product for accessing a single server application executing on a processing system having multiple TCP/IP instances and wherein the single server application is accessed through a first of the multiple TCP/IP instances, comprising:
a computer-readable storage medium having computer-readable program code means embodied in said medium, said computer-readable program code means comprising:
computer-readable program code means for establishing a registration repository continuing information sufficient to identify to both the single server application and a client application seeking to access the single server application, the first TCP/IP instances through which the single server application may be accessed by client applications and wherein the registration repository is accessible by the multiple TCP/IP instances and the single server application; and computer-readable program code means for accessing the registration repository to select a TCP/IP instance for connection to the server application so that the single server application and the client application seeking to access the single server application may both access the registration repository to allow direct communications between the single server application and the client application utilizing the first TCP/IP instance through which the single server application may be accessed and wherein the registration repository information is provided to the client application utilizing a second TCP/IP instance different from the first TCP/IP instance.

17. A system according to claim 15, wherein the means for establishing a registration repository comprises means for registering a TCP/IP instance with the registration repository if single server access is requested by a client application utilizing the TCP/IP instance.

18. A system according to claim 17, wherein said means for registering comprises:
means for storing an entry identifying an available TCP/IP instance; and
means for storing a time stamp associated with the entry identifying the available TCP/IP instance which identifies when the TCP/IP instance was registered with the registration repository.

19. A system according to claim 18, wherein the entry identifying the TCP/IP instance includes a TCP/IP instance identifier and protocol information sufficient to allow connection between the TCP/IP instance and the client.

20. A system according to claim 17, further comprising means for removing from the registration repository a TCP/IP instance which is no longer available for connection to the single server application or client access to the single server application.

21. A system according to claim 20, wherein the means for removing comprises means for invalidating the registration of the TCP/IP instance in the registration repository.

22. A system according to claim 15, wherein the single server application comprises means for selecting the TCP/IP instance from the registration repository to be used for connection to the single server application.

23. A system according to claim 22, further comprising:
means for storing an entry identifying an available TCP/IP instance in the registration repository; and
means for storing a time stamp associated with the entry identifying the available TCP/IP instance in the registration repository; and
wherein said means for selecting a TCP/IP instance comprises means for selecting the TCP/IP instance with the earliest time stamp.

24. A system according to claim 22, wherein the client application comprises:
means for accessing the registration repository to determine the TCP/IP instance through which the single server application may be accessed; and
means for connecting to the single server application by connecting to the TCP/IP instance through which the single server application may be accessed.

25. A system according to claim 22, wherein the client application determines the TCP/IP instance through which the single server application may be accessed utilizing the same procedure by which the single server application selects a TCP/IP instance.

26. A system according to claim 24, wherein the registration repository is stored in common storage and wherein said means for accessing the registration repository comprises:
means for accessing the common storage location of the registration repository; and
means for obtaining from the common storage location registration information to determine the TCP/IP instance through which the single server application may be accessed; and
wherein said means for connecting to the single server application comprises means for connecting to the determined TCP/IP instance through which the single server application may be accessed.

27. A system according to claim 26, wherein said common storage is directly accessible by the client and wherein said means for accessing the common storage comprises means for directly accessing the common storage.

28. A system according to claim 26, wherein said means for accessing the common storage comprises means for accessing the second TCP/IP instance to access the common storage location of the registration repository;
wherein said means for obtaining registration information comprises means for obtaining registration information from the common storage location through the second TCP/IP instance; and
wherein said means for connecting to the single server application comprises means for connecting to the first TCP/IP instance through which the single server application may be accessed.

29. A computer program product according to claim 16, wherein the computer readable program code means for establishing a registration repository comprises computer readable program code means for registering a TCP/IP instance with the registration repository if single server access is requested by a client application utilizing the TCP/IP instance.

30. A computer program product according to claim 29, wherein said computer readable program code means for registering comprises:
computer readable program code means for storing an entry identifying an available TCP/IP instance; and
computer readable program code means for storing a time stamp associated with the entry identifying the available TCP/IP instance which identifies when the TCP/IP instance was registered with the registration repository.

31. A computer program product according to claim 30, wherein the entry identifying the TCP/IP instance includes a TCP/IP instance identifier and protocol information sufficient to allow connection between the TCP/IP instance and the client.

32. A computer program product according to claim 29, further comprising computer readable program code means for removing from the registration repository a TCP/IP instance which is no longer available for connection to the single server application or client access to the single server application.

33. A computer program product according to claim 32, wherein the computer readable program code means for removing comprises computer readable program code means for invalidating the registration of the TCP/IP instance in the registration repository.

34. A computer program product according to claim 16, wherein the single server application comprises computer readable program code means for selecting the TCP/IP instance from the registration repository to be used for connection to the single server application.

35. A computer program product according to claim 34, further comprising:

computer readable program code means for storing an entry identifying an available TCP/IP instance in the registration repository; and computer readable program code means for storing a time stamp associated with the entry identifying the available TCP/IP instance in the registration repository; and wherein said computer readable program code means for selecting a TCP/IP instance comprises computer readable program code means for selecting the TCP/IP instance with the earliest time stamp.

36. A computer program product according to claim 34, wherein the client application comprises:

computer readable program code means for accessing the registration repository to determine the TCP/IP instance through which the single server application may be accessed; and computer readable program code means for connecting to the single server application by connecting to the TCP/IP instance through which the single server application may be accessed.

37. A computer program product according to claim 34, wherein the client application determines the TCP/IP instance through which the single server application may be accessed utilizing the same procedure by which the single server application selects a TCP/IP instance.

38. A computer program product according to claim 36, wherein the registration repository is stored in common storage and wherein said computer readable program code means for accessing the registration repository comprises:

computer readable program code means for accessing the common storage location of the registration repository; and computer readable program code means for obtaining from the common storage location registration information to determine the TCP/IP instance through which the single server application may be accessed; and wherein said computer readable program code means for connecting to the single server application comprises computer readable program code means for connecting to the determined TCP/IP instance through which the single server application may be accessed.

39. A computer program product according to claim 38, wherein said common storage is directly accessible by the client and wherein said computer readable program code means for accessing the common storage comprises computer readable program code means for directly accessing the common storage.

40. A computer program product according to claim 38, wherein said computer readable program code means for accessing the common storage comprises computer readable program code means for accessing the second TCP/IP instance to access the common storage location of the registration repository;

wherein said computer readable program code means for obtaining registration information comprises computer readable program code means for obtaining registration information from the common storage location through the second TCP/IP instance; and wherein said computer readable program code means for connecting to the single server application comprises computer readable program code means for connecting to the first TCP/IP instance through which the single server application may be accessed.

* * * * *